Aug. 14, 1956 R. E. YAEGER 2,758,788

BINARY CODE TRANSLATOR, ADDER AND REGISTER

Filed Nov. 10, 1951 6 Sheets-Sheet 1

INVENTOR
R. E. YAEGER
BY
H. A. Burgess
ATTORNEY

BINARY CODE TRANSLATOR, ADDER AND REGISTER

Filed Nov. 10, 1951 6 Sheets-Sheet 2

INVENTOR
R. E. YAEGER
BY H. A. Burgess
ATTORNEY

BINARY CODE TRANSLATOR, ADDER AND REGISTER

Filed Nov. 10, 1951 6 Sheets-Sheet 3

INVENTOR
R. E. YAEGER
BY H. A. Burgess
ATTORNEY

Aug. 14, 1956 R. E. YAEGER 2,758,788

BINARY CODE TRANSLATOR, ADDER AND REGISTER

Filed Nov. 10, 1951 6 Sheets-Sheet 4

INVENTOR
R. E. YAEGER
BY H. A. Burgess
ATTORNEY

BINARY CODE TRANSLATOR, ADDER AND REGISTER

Filed Nov. 10, 1951 6 Sheets-Sheet 5

INVENTOR
R. E. YAEGER
BY H. A. Burgess
ATTORNEY

BINARY CODE TRANSLATOR, ADDER AND REGISTER

Filed Nov. 10, 1951 6 Sheets-Sheet 6

INVENTOR
R. E. YAEGER
BY H. A. Burgess
ATTORNEY

United States Patent Office 2,758,788

Patented Aug. 14, 1956

2,758,788

BINARY CODE TRANSLATOR, ADDER, AND REGISTER

Robert E. Yaeger, Califon, N. J., assignor to Bell Telephone Laboratories, Incorporated, New York, N. Y., a corporation of New York Application November 10, 1951, Serial No. 255,823

18 Claims. (Cl. 235—61)

This invention relates to improvements in electrical systems wherein the intelligence is represented in accordance with a binary code. In its particular embodiments disclosed, the invention is described as relating to the translation of numbers in reflected binary code to numbers in the conventional binary code, the addition of two numbers in binary code, and the shifting of registered binary digits.

Binary code representation of intelligence is now quite commonly used, for example, in digital computers and in pulse code modulation systems. In digital computers, the code groups made up of permutations of bivalued elements may represent decimal numbers. In pulse code modulation systems, the code groups customarily represent instantaneous sample amplitudes of a message wave. In systems employing pulses, the two values of the code may be represented by "On" pulses and "Off" pulses, so that it is necessary during any code element interval to determine merely whether or not a pulse is present. In other systems, such as certain digital computers, the two values of the code are represented by two steady voltage levels which may be both positive, both negative, or one positive and one negative. In such systems, it is necessary merely to discriminate between the two voltage levels to determine the code elements. Still other systems, such as those described below, employ combinations of the two just mentioned.

The two values or characters of the binary code will be referred to herein as "1" and "0" in accordance with the customary parlance. Further, a code group will be referred to as a number, although it should be understood that the numbers themselves may represent any form of intelligence, such as an instantaneous message sample, the angular position of a shaft, or a decimal number. The code elements will be referred to as digits.

One form of the binary code is that which follows the binary scale of notation and which will be termed the "conventional binary code" herein. Each digit of a code group in conventional binary code represents a certain component of the decimal number or amplitude represented by the code group. An advantage of this code is the ease with which it may be decoded, since the significance of the digits is parallel to the denominational order of the corresponding digits of the binary number. A system for decoding that utilizes this property of the conventional binary code is disclosed in a Patent No. 2,514,671, issued July 11, 1950, to A. J. Rack.

Another form of binary code is described in a copending application of F. Gray, Serial No. 785,697, filed November 13, 1947, which issued on March 17, 1953 as Patent No. 2,632,058. From the manner in which this code may be constructed, it has been termed the "reflected binary code" and is referred to herein by that name. This code has certain distinct advantages. One property of the code giving rise to such an advantage is that the code groups or numbers representing successive amplitudes or decimal numbers differ in only one code element or digit. Coding errors due to ambiguity at a transition from one quantum step to the next cannot therefore exceed one quantum step, whereas a similar error in a coder employing the conventional binary code may give rise to a resulting error of many quantum steps and in an angular encoder to an error in reading as great as 180 degress. On the other hand, the process of decoding the reflected binary code is in general more complicated than the process required for decoding numbers in the conventional binary code. This difficulty may be said to result from the fact that the elements or digits of the reflected binary code cannot be said to have the same simple significance as the code elements of the conventional binary code. It is, however, possible to decode the reflected binary code numbers by a process of weighting the individual code elements, as is described in the above-mentioned Gray application. The process of addition also requires more complicated apparatus with numbers in reflected binary code than with numbers in the conventional code.

Because of the advantages of the reflected binary code in the coding operation and the advantages of the conventional binary code in the decoding and other operations, it is often desirable to convert from one to the other and particularly to translate code combinations in reflected binary code into code combinations in the conventional binary code. The application of F. Gray referred to above describes certain systems for effecting this translation. Still another system is described in an application of R. L. Carbrey, Serial No. 75,875, filed February 11, 1949, and issued October 16, 1951, as Patent 2,571,680.

In an embodiment of the invention described in detail below for illustrative purposes, the reflected binary code is employed in the coding operation, and the number obtained thereby is read into a linear array of binary registers. Before transmission or further operations on the code numbers, it is translated into the conventional code, the translated number remaining in the same array of registers. One register is provided for each digit, the binary characters "1" and "0" being represented at an output of each register by two steady voltage levels.

The translation process employs a series of comparisons. The first or most significant digit remains unchanged in the translation process. The conventional binary digit of next lower significance, the second digit, depends on a comparison of the first conventional binary digit and the second reflected binary digit. If these two digits are alike 0, 0, or 1, 1, the resulting conventional binary digit is a "0"; if they are different, 0, 1, or 1, 0, the resulting digit is a "1." Logically speaking, this is a Not And comparison; e. g. the given proposition is true (1) if A is Yes (1) or if B is Yes (1) but not if A and B are both Yes or if A and B are both No (0), where a "1" signifies truth and a "0" falsity. The third conventional binary digit, i. e., the third most significant digit, depends on a similar comparison of the resulting second conventional binary digit with the third reflected digit. When these comparisons have been completed down to the least significant digit, the number standing in the registers is the conventional binary equivalent of the originally read-in number in reflected binary code. In the illustrative embodiment described below, each register but the one storing the most significant digit has a reset terminal. Pulses applied to these terminals "reset" the registers by causing them to change state so that if previously storing a "1," they will now store a "0," and vice versa. Pulses are applied to each reset terminal, however, only if the register storing the digit of next higher significance is storing a "1." A coincidence gate makes the latter determination. Further, the pulses are applied to the reset terminals of the register in order commencing with the register storing the second most significant digit. Since the most significant digit remains unchanged during the translation process, no reset pulse is applied to the register storing this digit. The final state of the registers represents the translated number.

A feature of the invention is that the reflected binary digits are read into registers so that simultaneous read-in is not required. Another feature is that the translated number is stored in the register after the translation process, permitting shifting or reading out at any desired later time.

In accordance with another principle of the present invention also described in detail below, binary registers, which may be the same ones utilized in the translation operation mentioned above, can perform the function of binary addition by the addition of but a few simple circuit elements. These additional elements, in one embodiment, are in the form of On-Off switches which may be either electronically or manually operated. One of these switches is connected to the reset terminal of each of the binary registers, including the register storing the most significant digit. The switches are opened to represent a "0" and closed to represent a "1." For addition, the output of each of the registers is connected to the reset terminal of the register storing the digit of next higher significance in such a manner that the latter register will be reset when the register of lower significance changes from a "1" to a "0." Pulses are then sequentially applied to each of the switches commencing with the switch associated with the register storing the digit of least significance. The number represented by the positions of the switches will thus be applied as "On" or "Off" voltages and added to the number previously stored in the register.

In an illustrative system described in detail below, a number in reflected binary code is first read into the registers. A pulse is then sequentially applied to the translate gates as mentioned above to translate the register number from reflected to conventional binary code. A pulse is then applied to the add switches, as also described above, to add a number determined by the setting of the switches to the translated number stored in the register. Shift pulses are then applied to the registers to shift the sum digits out of the registers to an output circuit.

A feature of the invention is that substantially the same apparatus is employed to perform the functions of code translation, binary addition, and digit shifting, as well as binary storage. Further, the few additional components required for the various processes are, for the most part, similar, thereby enhancing the feasibility of standardization and packaging. Time sharing is also readily possible with circuits of the present invention.

An object of the invention is an improved system for translating numbers in reflected binary code to numbers in conventional binary code.

A related object of the invention is to increase the reliability of a code translation process of the type described.

Another object of the invention is to combine the functions of code translation and binary addition with a minimum of components.

Another object of the invention is to shift the digits out of a register capable of performing the functions of code translation and binary addition without interfering with these functions.

Another object of the invention is to simplify the circuits required to perform binary addition.

It is also an object of the invention to simplify and improve the apparatus required to represent the angular position of a rotating shaft by binary characters in accordance with the conventional code and, where desired, to include in the resultant conventional binary code number a predetermined correction factor or the like.

Another object of the invention is to improve binary addition apparatus capable of adding a number in reflected binary code to a number in conventional binary code and producing the sum in the latter code.

Several of the illustrative circuits described below employ transistors and in particular point contact or type A transistors whose semiconductive bodies comprise *n*-type material. Transistors of this type are described, for example, in an article by R. M. Ryder and R. J. Kircher, entitled "Some Circuit Aspects of the Transistor," published in the Bell System Technical Journal for July 1949 as well as in Patent 2,524,035 issued October 3, 1950, to J. Bardeen and W. H. Brattain. The usual current direction convention is employed in the description, i. e., electrode currents are deemed positive if they flow from the electrode into the semi-conductive body. If *p*-type units were employed, current directions and voltage polarities would, in general, be the reverse of those shown. The invention should not, however, be deemed to be limited to a particular type of transistor, nor should it be deemed to be limited to the use of transistors, since vacuum tubes, for example, could also be used.

These and other objects and features of the invention may be better understood from a consideration of the following description when read in accordance with the attached drawings, in which.

Figure 1:
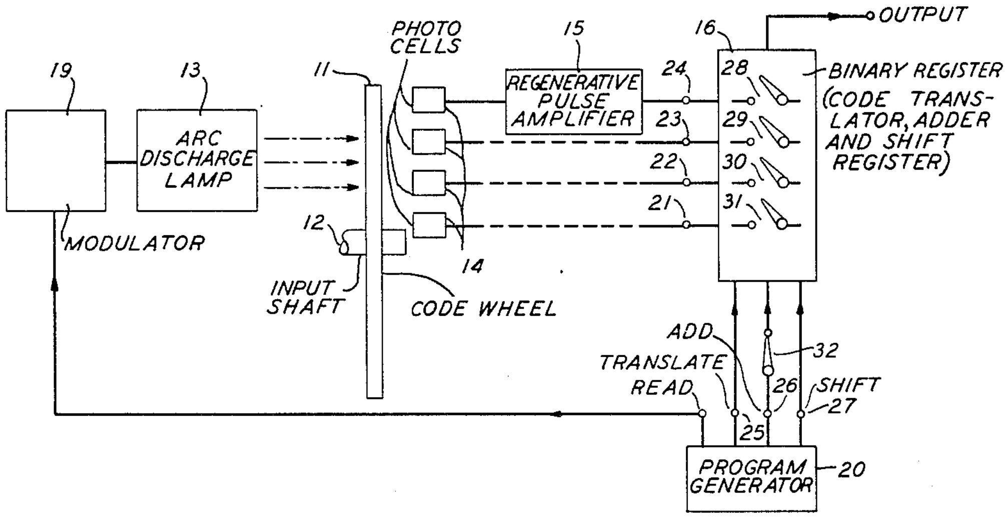
Fig. 1 illustrates by block schematic diagram an optical angular position encoding system to which principles of the present invention may be applied.

The general purpose of an angular position encorder is to translate the angular position of a rotatable shaft into a digital code; it is, therefore, an analog-to-digital translator. Fig. 1 illustrates a system for accomplishing this translation utilizing a code wheel. The code wheel 11 is rigidly mounted on the shaft 12. Light from a source 13 is passed through slots in the wheel to a group of photocells 14, each cell representing a digit of information. The current pulses delivered by the photocells, when energized, are amplified by regenerative pulse amplifiers 15 and are fed into a binary register 16 which performs the function of code translation, serial addition (if desired), and digit shifting.

Figure 2:
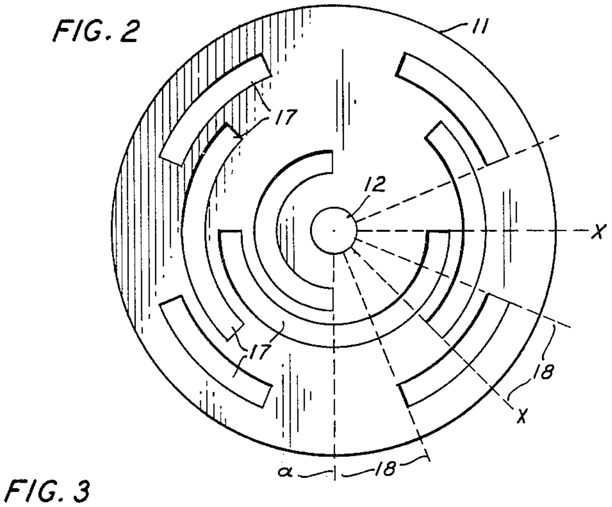
Fig. 2 is a plan view of the code wheel shown in Fig. 1.

A plan view of the code wheel is shown in Fig. 2.

Each digit is represented by a concentric ring pattern of slots 17 in the wheel. The slots could alternatively be transparent sections of an otherwise opaque glass plate; photographic-etching techniques are applicable to the forming of such openings where they are extremely small. The significance of the digit positions decreases outwardly from the shaft 12 so that the innermost slot represents the most significant digit and the outermost slots the least significant digit. The digit slots are arranged so that the slots representing the least significant digit and including the smaller angles fall on the concentric circles of larger radius. This enhances the accuracy with which the wheel may be fabricated in an obvious manner.

The digits are "read" along a fixed radius. As the code wheel rotates with the shaft, the combinations of digits at a fixed radial line change. With a four-digit code, as shown in Fig. 2, there will be $2^4$ or 16 changes for one 360-degree revolution of the wheel. This means that the encoder can discriminate 16 quantum steps or angular positions. With more digits, smaller quantum steps can be recognized.

The magnitude of the quantum steps on the four-digit code wheel shown in Fig. 2 is illustrated by the dotted-radial lines which indicate several successive radii at which the code changes. Were the conventional binary code used instead of the reflected code, there would be a problem of ambiguity from one quantum step to the next. For example, at the dotted line *a*, the reflected code changes from 0100 to 1100, the wheel rotating counter-clockwise under the dotted line, a change of but a single digit and representing a change decimally of from 7 to 8. The conventional binary code groups for these numbers are 0111 and 1000, a change of all four digits. The reflected code is, therefore, preferable for this type of encoding, since there is never a change of more than one digit between adjacent quanta, regardless of the number of digits in the code. Ambiguity errors are therefore limited to one quantum step.

The light source 13 is a high intensity arc discharge lamp which supplies a short but intense pulse of light when triggered. The SA309 manufactured by the Sylvania Electric Products, Incorporated, is suitable for this purpose. Further, this lamp has a long filament which is mounted parallel to a radius of the wheel. A "read" pulse is applied to the modulator 19 which triggers the light source 18 causes instantaneous sampling of the reflected binary code digits on the radius illuminated by the light. A radial defining slit may be mounted between the photocells and the code wheel to reduce ambiguity errors which may result from the lamp illuminating an angular area spanning two discrete angular quanta.

The photocells 14 may, for example, comprise light-sensitive p-n junction diodes of the type described in R. S. Ohl Patent 2,402,660, dated June 25, 1946. One photocell is provided for each digit of the code, and each cell is mounted to respond only to light shining through the slots of one of the concentric rings. In other words, there is a photocell for each order of significance, and the output of each photocell represents one digit of information.

The current pulses produced by the photocells will normally be low energy pulses so that some amplification may be required. Since the information is fairly simple in nature, i. e., either "Yes" or "No," simple regeneration may be employed rather than linear amplification. The regenerative amplifiers 15 are, therefore, essentially monostable multivibrators which deliver an output pulse of the desired energy when triggered by a current pulse from their associated photocell.

Each time a "read" pulse is delivered by the program generator to trigger the light source 13, a parallel group of pulses will appear at the input terminals 21—24 of the binary register. Each group of pulses is the reflected binary code representation of the angular position of the shaft 12, a pulse representing a "1" and the absence of a pulse a "0." Further, each group of pulses is stored in parallel form in the binary register 16 until a translate pulse is applied by the program generator to control terminal 25. In accordance with principles of the invention to be described in detail below, the registered number will, upon the application of a translate pulse, be translated into parallel conventional binary code. The translated number will then be stored until an add pulse is applied to control terminal 26. In accordance with other principles of the invention, the add pulse will convert the number stored in the register to the sum of the translated number and another number represented by the position of switches 28—31, a switch being closed to represent a "1" and left open to represent a "0." This latter number may be a fixed correction factor, accounting, for example, for known discrepancies in the coding process or for some fixed deviation in the angular position of the input shaft. The number representing the sum may be "read out" either in parallel or in series. In the illustrative embodiment, the registered number is "read out" in series with the least significant digit first upon the application of a series of shift pulses, one for each digit to control terminal 27. The register will be cleared to receive the next group of digits when the last digit of the preceding number is read out.

Figure 1A:
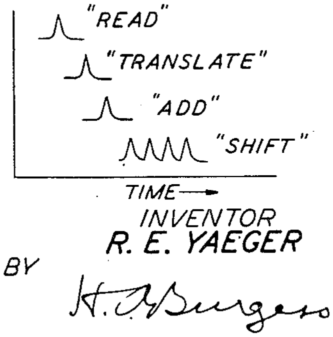
Fig. 1A is a timing diagram illustrative of Fig. 1.

The time diagram in Fig. 1A illustrates the sequence of operations by showing the relative timing of the control pulses delivered by the program generator.

It may be noted that the overall system shown in Fig. 1 translates an analog representation into a digital representation in parallel reflected binary code which is, in turn, translated into conventional parallel binary code which is, in turn, translated into sequential conventional binary code. Further, the number read out may include a fixed correction factor, although, by omitting the add pulse, for example, by opening the switch 32, it will not.

Figure 3:
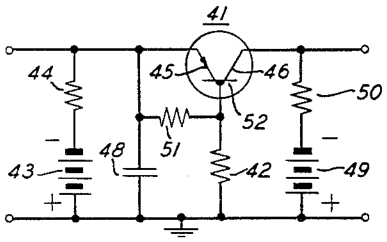
Fig. 3 illustrates schematically a regenerative pulse amplifier which may be employed in the circuit of Fig. 1.

A regenerative pulse amplifier which may be employed in the box 15 in Fig. 1 is shown by way of example in Fig. 3. This circuit is of the type disclosed and claimed in a copending application of A. E. Anderson, Serial No. 166,733, filed June 7, 1950, which issued on May 17, 1955 as Patent No. 2,708,720. This circuit is essentially a monostable transistor multivibrator circuit whose central element is the current multiplication transistor 41. The base resistor 42 is fairly large and provides sufficient regenerative feedback to give rise to a region of negative resistance in the emitter current-emitter voltage characteristic of the transistor. The load line is determined by the voltage of the emitter supply battery 43 and the size of the resistor 44. By proper proportioning of the resistor 44 and battery 43, the circuit may be made either monostable, astable, or bistable; in the present application, it is monostable. This circuit is normally Off due to the negative bias applied to the emitter electrode 45 by the battery 43. The circuit will be turned on, however, by the application to the emitter of a positive pulse of sufficient amplitude to drive the circuit into its negative resistance region. There being but one stable point, however, the circuit rapidly returns from its negative resistance region characterized by positive emitter current to this one stable point in the negative emitter current region, having delivered an output pulse at the collector electrode 46 during its excursion through the negative resistance region. The duration of the positive output pulse is determined primarily by the magnitude of the base resistor 42, the condenser 48, and the collector supply battery 49, and resistor 50. The resistor 51 which shunts the emitter and base 52 electrodes aids in stabilizing the trigger point and also speeds up recovery time in the negative emitter current region.

A table of representative reflected and conventional binary code groups is set forth in the table below for comparison with each other and also with their equivalent decimal numbers.

*Table I*

| Decimal | Reflected binary | Conventional binary |
|---|---|---|
| 0 | 0000 | 0000 |
| 1 | 0001 | 0001 |
| 2 | 0011 | 0010 |
| 3 | 0010 | 0011 |
| 4 | 0110 | 0100 |
| 5 | 0111 | 0101 |
| 6 | 0101 | 0110 |
| 7 | 0100 | 0111 |
| 8 | 1100 | 1000 |
| 9 | 1101 | 1001 |
| 10 | 1111 | 1010 |
| 11 | 1110 | 1010 |
| 12 | 1010 | 1100 |
| 13 | 1011 | 1101 |
| 14 | 1001 | 1110 |
| 15 | 1000 | 1111 |

The arithmetical expressions by which reflected binary code may be translated to conventional binary code are set forth in the Carbrey and Gray applications mentioned above and will not be described herein. The basic nature of the translation process as employed herein may be seen by inspecting corresponding groups of reflected and binary code numbers. It should be noted first that the most significant digits of the reflected and conventional binary code numbers are the same. Therefore, in translating reflected to conventional binary code, the first or most significant digit remains unchanged. The second or next most significant conventional binary digit depends on a comparison of the first conventional binary digit and the second reflected binary digit. If the digits compared are alike (0, 0, or 1, 1), the resulting conventional binary digid is a "0"; or if they are different (0, 1, or 1, 0), the resulting conventional binary digit is "1." For example, referring specifically to the code groups corresponding to the number 9, the first conventional binary digit is a "1" and the second reflected binary digit is also a "1." In accordance with the rule just set forth, the second conventional binary digit is, therefore, a "0." The third conventional binary digit depends on a similar comparison of the second conventional binary digit with the third reflected binary digit. For the number 9, these digits are both "0's" so that the third conventional binary digit is also a "0." The fourth conventional binary digit depends on a similar comparison, viz., the third conventional code digit with the fourth reflected digit. Since the third conventional binary digit of the code group representing the decimal number 9 is a "0" and the fourth reflected binary digit is a "1," i. e., they are unlike, the fourth conventional binary digit is a "1."

To generalize, the comparison is between the $n^{th}$ reflected binary digit and the $(n-1)^{th}$ conventional binary digit for all but the most significant of digits, where $n$ equals one for the most significant digit and increases linearly as the order of significance decreases. If the comparison shows like digits, the $n^{th}$ conventional binary digit is a "0." If the comparison shows unlike digits, the $n^{th}$ conventional binary digit is a "1." As previously mentioned, this, logically speaking, is a Not And comparison.

Figure 4:
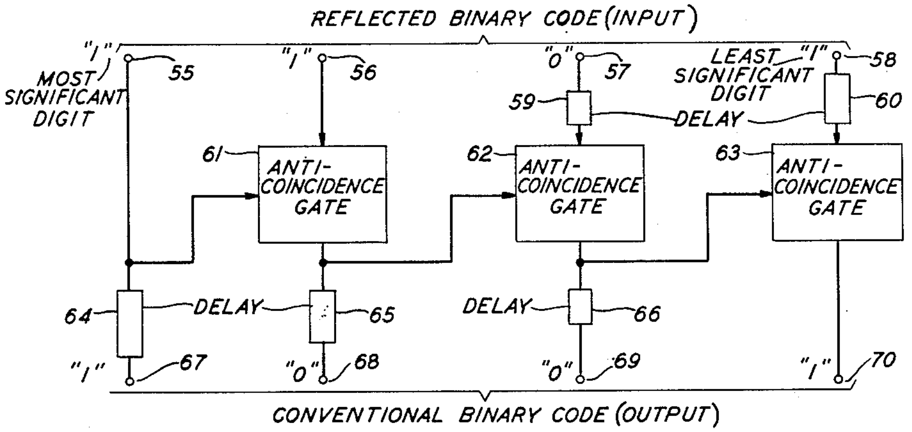
Fig. 4 illustrates by block schematic diagram the basic nature of the code translation process employed in the present invention.

The code translation circuit shown in Fig. 4 is generally of the type described in the above-mentioned Carbrey application and performs the comparisons just described electronically. Assuming the reflected binary digits to appear simultaneously at the input terminals 55—58, delays 59 and 60 are added to stagger their arrival time at the anticoincidence gates 61—63. The anticoincidence gates may, for example, be of the type disclosed in a copending application of L. W. Hussey, Serial No. 198,688, filed December 1, 1950. This type of gate produces an output only if one and only one of its two inputs is enabled at any given time or during a given time interval. The gates 61—63 in Fig. 4 are adapted to be enabled by "1's," i. e., by voltages representative of "1's," at their inputs. Further, the inputs for a given gate are the $n^{th}$ reflected digit and the $(n-1)^{th}$ conventional digit; these gates, therefore, simulate electronically the logical Not And comparison.

The first or most significant digit of the reflected code remains unchanged in the translation process. This digit is also applied to the anticoincidence gate 61 for a Not And comparison with the second or next most significant digit of the reflected code. If these digits are alike, the gate 61 will produce no output; it will produce an output only if the input digits are unlike. The resulting second conventional binary digit, appearing at the output of gate 61, is applied in a similar manner to the next anticoincidence gate 62 for comparison with the third reflected binary digit. In a similar manner, the third conventional binary digit is applied to the anticoincidence gate 63 for comparison with the least significant reflected binary digit. In accordance with the process just described, it may be seen that if the input number is 1101, as indicated, corresponding to the decimal number 9, the output number at terminals 67—70 will be the corresponding conventional binary number 1001. The delays 64—66 in the output leads may be proportioned so that the digits arrive at the output terminals either simultaneously, as indicated, for parallel transmission systems, e. g., frequency division multiplex, or sequentially, as in time division multiplex.

It may be noted that the translator shown in Fig. 4 requires fairly accurate timing of the input digits and of the delays, although means described in the above-mentioned Hussey application may be employed to permit a certain amount of inaccuracy in input timing. It may be also noted that this translator does not register the translated number but merely "remembers" it for a short period determined by the output delays 64—66. In other words, it has a short memory. A code translator employing principles of the present invention remembers the translated number indefinitely, if desired, and does not require precise timing of the inputs.

Figure 5:
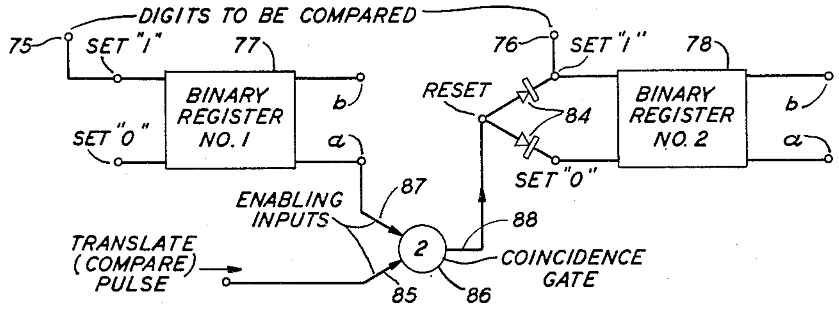
Fig. 5 illustrates by block schematic diagram a code translator employing principles of the present invention.

In accordance with principles of the present invention, the circuit configuration shown in Fig. 5 combines both the functions of code translator and code register, reducing the total number of components normally required for these two functions. The overall circuit, logically speaking, is a program control Not And gate. The digits to be compared are first applied to terminals 75 and 76 and "read" into the binary registers 77 and 78. These registers may be any of the well-known devices for storing information in binary form; bistable devices, such as conventional Eccles-Jordan multivabrators, are well-known devices of this kind. Each of these registers has two input terminals "set to 1" and "set to 0" and two output terminals *a* and *b*. The designations of the input terminals, "set to 1" and "set to 0" connote their respective functions. For example, a pulse of the proper polarity applied to the "set to 1" input of register 77 will set this register in a stable state manifested by voltages indicative of the binary digit "1" at its output terminals. If it is already in this state, there will be no change. A pulse applied to the "set to 0" input will set the register in its other stable state characterized by "0" indicating voltage levels at its output terminals. The registers 77 and 78 produce symmetrical outputs, that is, a voltage indicative of the digit being stored is produced at one of the output terminals, terminal *a* in the figure, while the logical negative of this digit is represented at the other output terminal *b*. Register 78 is also equipped with a reset terminal. A pulse of the proper polarity applied to this terminal will, by virtue of the steering diodes 84, cause the register 78 to change state so that if it were previously storing a "1," it will be reset to "0," and vice versa.

To examine the operation of this circuit, assume that both registers have been cleared by a previous operation and that a new pair of digits is read into the register stages by setting those stages to "1" where the digit is "1" and leaving the other stages in a "0" condition. A translate or compare pulse is then applied as an enabling input to input 85 of the coincidence gate 86. The coincidence gate 86 has two inputs 85 and 87 and one output 88 and produces an output when and only when both of its inputs are enabled. A switching type coincidence gate is described, for example, in the Hussey application mentioned above. The input 87 will be enabled if the digit stored in the first register is a "1," that is, input 87 will be enabled if the voltage at terminal *a* of register 77 is representative of a "1." A pulse will therefore be applied to the reset terminal *r* of register number 2 upon the application of a translate pulse only if register number 1 is storing a "1." If the gate does, in effect, transmit the translate pulse, it will then change the state of register number 2. The final state of the second register is the Not And comparison of the original numbers applied to terminals 75 and 76. This can readily be checked by trying out the four possible combinations 0, 0, and 1, 1, which result in a "0" at the second register; and 1, 0, and 0, 1, which result in a "1." The desirable feature of this circuit is that the input signals to be compared do not have to be coincident. The only timing requirement is that the registers be set before the comparison or translate pulse is applied. A transmission type gate of the type disclosed in Patent 2,535,303, issued December 26, 1950, to W. D. Lewis, could alternatively be employed as the coincidence gate 86 with the gate control connected to terminal *a* of the first register; this type of gate would transmit, when enabled, a more or less accurate replica of the translate pulse to the reset terminal of the second register.

Figure 6:
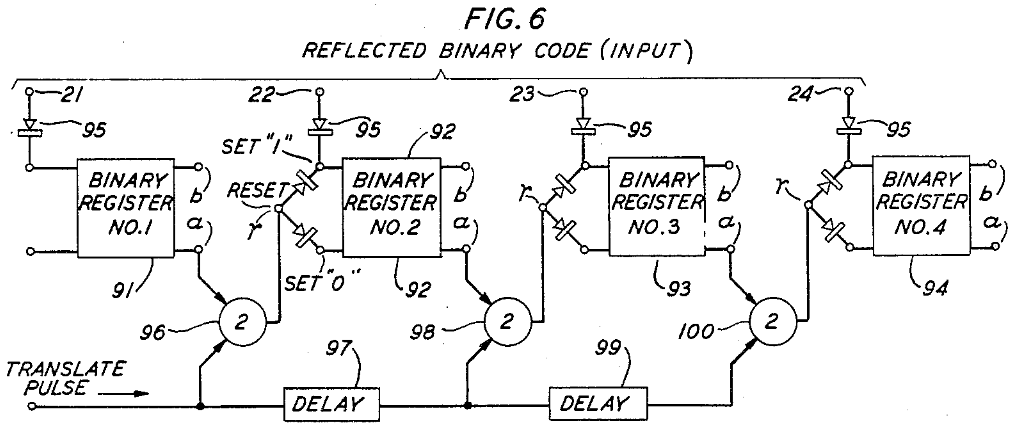
Fig. 6 illustrates by block schematic diagram a code translator employing principles of the present invention for translating a four-digit number in reflected binary code into its equivalent number in conventional binary code.

Fig. 6 shows a configuration for a reflected-to-conventional binary translator incorporating the Not And gate combination just described. Each of the register stages 91—94 is also a part of a complete shift register, the connecting circuits of which are not shown for reasons of simplicity. Registers 91—94 are similar to registers 77 and 78 of Fig. 5 and have been labeled in a similar fashion. To examine the translation operation, assume that the entire register has been cleared so that all of the binary registers are in a state of "0." Under the control of the system program, not shown, a number in reflected binary code is read in the encoder, such as the one shown in Fig. 1, and the digits, in the form of short duration pulses, appear at the terminals 21—24 and are applied to the "set 1" inputs of the registers through the isolation diodes 95. There will be no pulses at those terminals at which a "0" is present. When the registers have stabilized, storing the parallel reflected binary code number, a translate program pulse is applied to the coincidence gate 96 associated with the register 91 storing the most significant digit. The Not And comparison described above is then made with the most significant digit in register number 1, which remains unchanged, and the digit in register number 2, which is storing the reflected digit of next lower significance. The resulting condition of register number 2 is the conventional binary equivalent of the original second reflected code digit. After a time delay determined by the delay 97 which is of sufficient length to insure translation and stabilization in register number 2, the translate pulse is applied to the coincidence gate 98 associated with the second register, thereby comparing the state of registers numbers 2 and 3. After this comparison, the digit in register number 3 is in conventional binary code. After a further delay determined by delay 99, the translate pulse is applied to coincidence gate 100; and when register number 4 has stabilized, the registers 91—94 will be storing the binary equivalent of the original reflected code number.

Translation from reflected-to-conventional binary code is, to a certain extent, a reversible process. It is, therefore, possible to use substantially the same apparatus to make the translation from conventional to reflected code as that illustrated in Fig. 6 for translating from reflected to the conventional code. It is necessary only to apply the translate pulses to the translate gates 96, 98, and 100 simultaneously which may readily be accomplished by omitting the delays 97 and 99. If the translate pulses are applied as just described, a number in conventional code standing in the registers 91—94 will, upon the application of the translate pulses, be translated into reflected code. In such a case, the gates 96, 98, and 100 will be required to have a certain amount of memory so that a succeeding register will respond to the previous state of the preceding register even though the latter is in a state of change.

Figure 7:
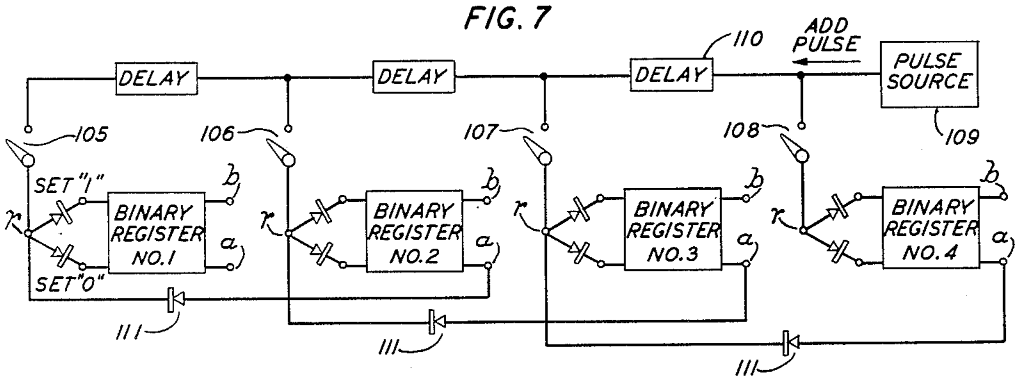
Fig. 7 is a block schematic diagram of a binary adder employing binary registers in accordance with principles of the present invention.

The same register stages which comprise the shift register and which also perform the translation process just described may also, in accordance with other principles of the present invention, perform binary addition, as shown in Fig. 7. The connections for shifting and translation have been omitted from Fig. 7 for the purpose of simplicity. To examine the addition operation, the registers are assumed to be storing a number in conventional binary code. The registers are arranged in the same order as previously, i. e., the register number 1 is storing the most significant digit. Further, each register has a reset terminal *r*. The switches 105—108 which may be manually, electronically, or otherwise controlled are set in accordance with a number to be added to the registered number. A switch is closed to represent a "1" and opened to represent a "0," thereby providing a means for storing the number to be added. The order of significance of the digits represented by the switches 105—108 is comparable to the order of significance of the digits stored in the registers to which the switches are connected. For example, the register number 4 is storing the least significant digit of the original number; the switch 108 is therefore opened or closed depending on the character of the least significant digit of the number to be added to the number in the registers. An "add" pulse from the pulse source 109 is first applied to the switch 108 connected to the register storing the digit of least significance, register number 4. If switch 108 is closed, the add pulse will be transmitted to the reset terminal *r* of register number 4 and reset this register. The output terminal of register number 4 is connected to the reset terminal of register number 3. In accordance with the invention, it is desired to reset register number 3 if register number 4 changes from a "1" to a "0" but not if it changes from a "0" to a "1." In other words, if there is a carry, it must be added to the digit of next higher significance. Since the registers produce symmetrical outputs, the voltages at their two output terminals *a* and *b* will be going in opposite senses for each change of state. The reset terminal of register number 3 will therefore be connected to that output terminal of register number 4 which produces the polarity of pulses required to reset register number 3 when register number 4 goes from a "1" to a "0," terminal *a* in the illustration. Assuming registers 3 and 4 to be each storing "1's," the add pulse transmitted through the first switch 108, which is assumed to be closed, will reset register number 4 to "0." The carry of "1" from this addition will be added to the digit in register number 3 by way of the connection of the output *a* of register number 4 to the reset terminal of register number 2. The output of register number 3 is connected in a similar manner to the input of register number 2 so that register number 2 will also be reset when register number 3 changes from a "1" to a "0." In a similar manner, register number 1 will be reset if register number 2 changes from a "1" to a "0." After a time delay provided by delay 110 sufficient for the addition of the first digit to proceed beyond register number 3, the add pulse is applied to the second add switch 107, which, if closed, will transmit the add pulse to the reset terminal of register number 3. In a similar manner, the add pulse will be sequentially applied to add switches 106 and 105 in the order named.

The diodes 111 may be necessary if the registers are sensitive at their outputs so as to isolate the sensitive outputs from the add pulses applied to the reset terminal *r*. If the register outputs are not sensitive, these diodes may be omitted. Gates may alternatively be employed.

The addition process just described comprises shifting the point of application of the input digits into the register as a whole as the significance of the digits to be added increases. If all the input digits were sequentially applied to the register of least significance, the circuit would be a scale-of-two circuit such as a binary counter. However, by shifting the point of insertion of the digits to be added, as just described, the function of binary addition is performed instead of binary counting. This process may be likened to adding two decimal numbers, for example, an addend 692 (the number stored in the register) and an augend 363 (the number represented by the switches). Instead of adding the numbers in the customary manner i. e., adding the digits of least significance, recording the sum, and adding the carry, if any, to the two digits of next higher significance and repeating the process until the digits of higher significance have all been added, the second number is broken down so that the numbers are, in effect, added as follows:

692+3=695
695+60=755
755+300=1055
(Check 692+363=1055)

It will be noted that for each addition of a pair of digits, the carry, if any, is added to all the digits of the addend of higher significance than the digits added before another augend digit is added, or at least to the digit of the addend equal in significance to the next augend digit to be added. If the numbers to be added were in binary form, e. g., 101 and 011, the process would be broken down as follows:

101+1=110
110+10=000
000+000=000
(Check 101+011=000)

This method of addition is much simpler than parallel addition and is more readily incorporated in a system which also performs the functions of translation and digit shifting than serial addition employing two "half-adders."

Figure 8:
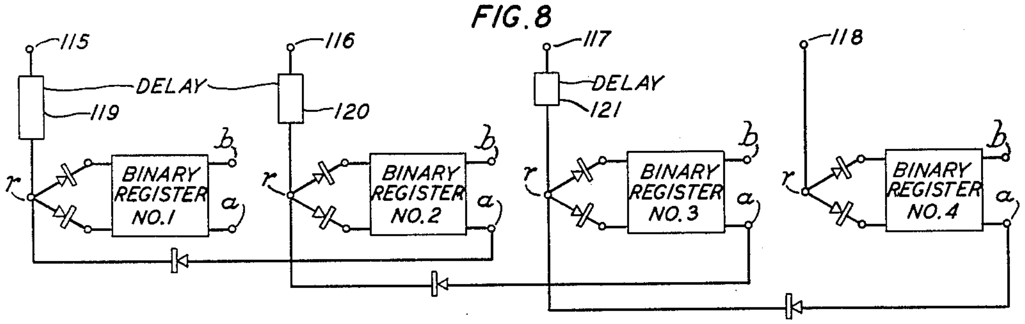
Figs. 8 and 9 illustrate other embodiments of binary adders which also employ principles of the invention.

Another adder employing these principles is shown in Fig. 8; connections for code translation and shifting have been omitted from this circuit also. A first binary number is assumed to have been read into the registers. The digits of a second binary number in the form of "On" and "Off" pulses are applied simultaneously to terminals 115—118. The delay elements 119—121 stagger the arrival times of these digits at the reset terminals *r* of the registers so that the least significant digit (at terminal 118) will have been added to the number in the registers or at least to the digits in registers numbers 4 and 3 before the digit of next higher significance (at terminal 117) is applied to register number 3; and so that the latter digit will have been added to at least the digits in registers numbers 3 and 2 before the next digit (terminal 116) is applied to register number 2, etc. The addition operation is otherwise the same as with the circuit in Fig. 7.

Instead of shifting the point of input into the registers as the significance of the digits to be added increases, the numbers themselves may be shifted while holding fixed the point of input. This may be likened to adding two numbers on a sheet of paper using a pencil to record the sums. Ordinarily, the paper remains stationary and the pencil is moved from right to left. Alternatively, the pencil may be held at a fixed place and the paper moved from left to right. The circuit in Fig. 9 is analogous to the latter alternative, while the circuits of Figs. 7 and 8 may be likened to the former.

Figure 9:
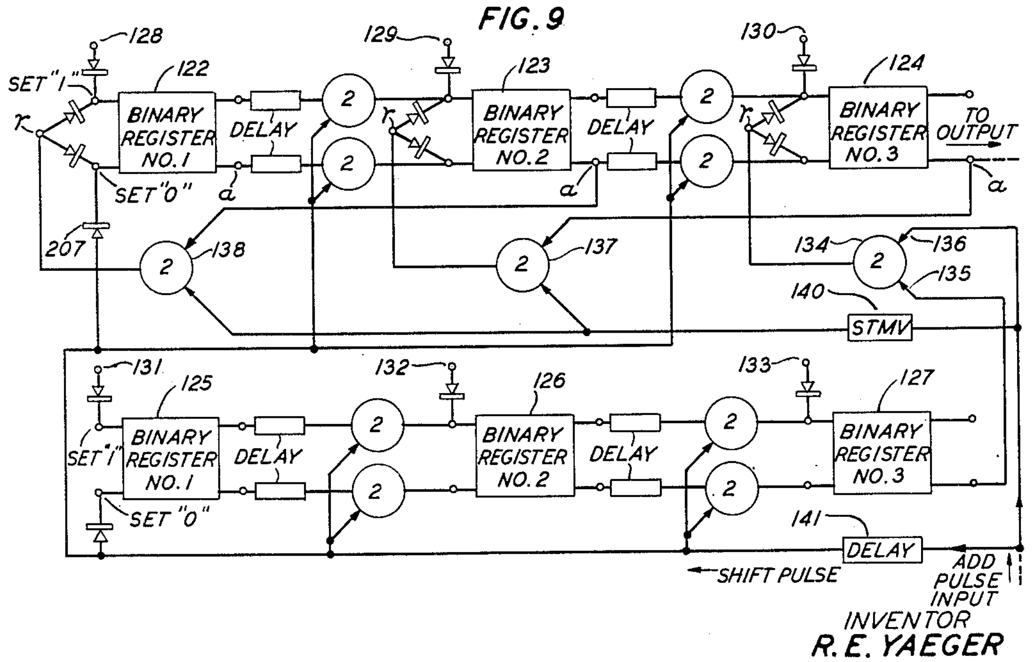

Two sets of registers 122—124 and 125—127 are employed in the circuit of Fig. 9 to register the two numbers to be added. Although only three-stage units are shown, the system may be extended in an obvious manner to include more stages. The numbers to be added are read into the two sets of registers from input terminals 128—130 and 131—133 with parallel registers storing digits of parallel significance and with the registers 122 and 125 storing the digits of greatest significance. A single coincidence or "adding" gate 134 is required to perform the addition. The input 135 of gate 134 will be enabled if the register 127 is storing a "1" but not if it is storing a "0." The other input 136 will be enabled upon the application of an "add" pulse.

When both inputs of the gate 134 are enabled, the gate produces an output which is applied to the reset terminal *r* of register 124 and which resets the latter; register 124 is storing a digit of the same significance as register 127. The outputs *a* of registers 124 and 123 are connected, respectively, to the reset terminals of registers 123 and 122, so that in a manner similar to the operation of the adders in Figs. 7 and 8, register 123 will be reset if register 124 changes from "1" to "0," and register 122 will be reset if register 123 changes from "1" to "0." When the gate 134 is enabled, therefore, the digit stored in register 127 will be added to the number comprising the digits stored in registers 124, 123, and 122. For example, if the digit in register 127 is the least significant digit, it will be added, upon the application of an add pulse, to the entire number orignally stored in registers 122—124. If the digit stored in register 127 is a higher order digit, it will be added only to the digits of the number originally stored in registers 122—124 of equal and higher significance.

Normally disabled gates 137 and 138 are inserted in the connections required for addition between the outputs *a* of registers 124 and 123 and the reset terminals of registers 123 and 122. These gates are enabled during the addition interval by a long pulse produced by the single-trip (monostable) multivabrator 140 which is triggered by the add pulse. The pulse produced by the multivibrator 140, when triggered, is long enough to permit the digit stored in register 127 to be added, if necessary, to the digits in all of the registers 122—124.

When the digit originally stored in register 127 has been added to the digits originally stored in registers 122—124, the digit remaining in register 124 represents the least significant digit of the desired final sum. A "shift" pulse is then applied to advance the digits one register from left to right, the digit stored in register 124 being passed on to an output circuit. The shifting process will be described in more detail in connection with Fig. 10. In Fig. 9, the "shift" pulse is merely an "add" pulse delayed by the delay 141. The delay 141 allows sufficient time for the adding operation to be completed before applying the delayed add pulse as a shift pulse to the shift gates. In the manner described above, the digit now standing in register 127 will be added to the digits standing in registers 123 and 124, register 122 having been cleared by the shifting process. This process is completed until all the digits originally stored in the registers have been added.

In some applications, it may be possible to dispense with the registers 125—127. For example, if the number to be added to the number stored in registers 122—124 arrives at the add gate 134 as a sequence of information, the addition operation may still be performed as just described without the need of registers 125—127 and associated circuitry if the shift pulses are synchronized with the arrival at the add gate 134 of the digits to be added. Such a sequence of information could, for example, come in from a remote station over a transmission line or from a local sequential type coder.

Figure 10:
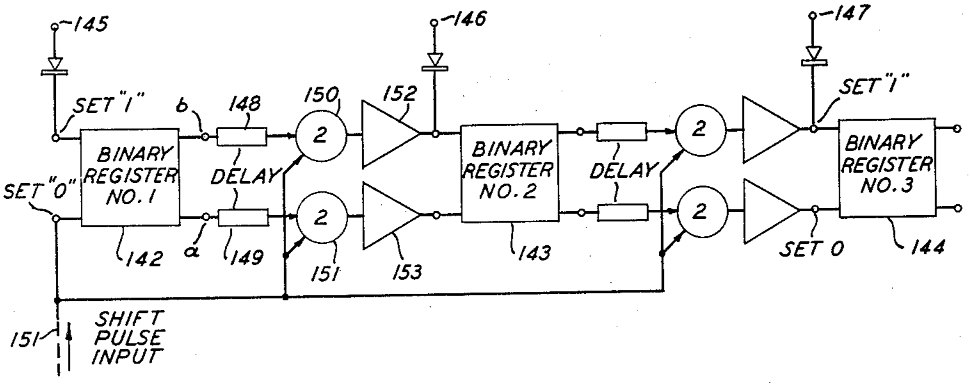
Fig. 10 illustrates by block schematic diagram a shift register.
Figure 11:
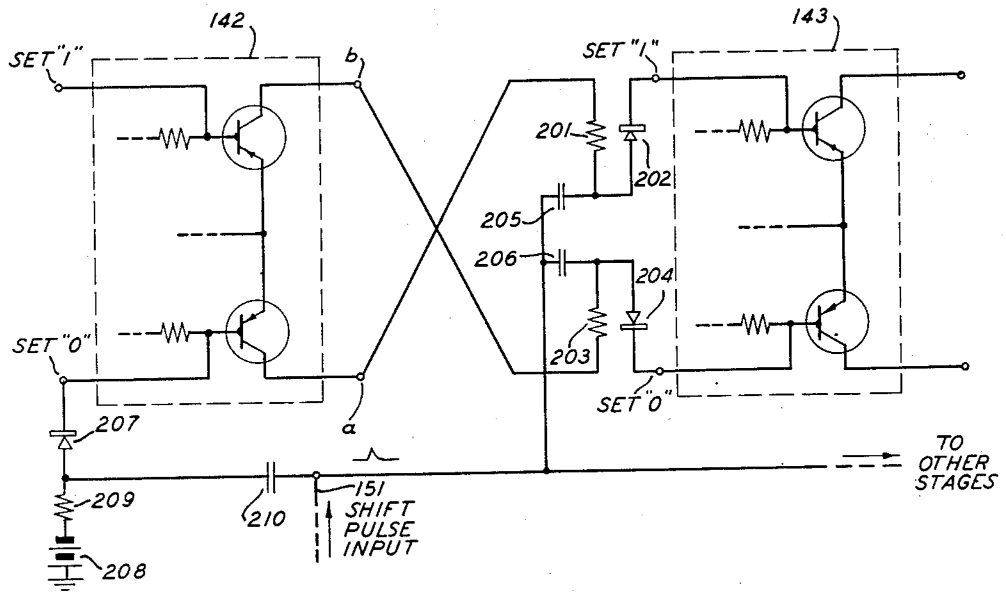
Fig. 11 illustrates schematically certain interstage circuits which may be employed in the circuit of Fig. 10.
Figure 12:
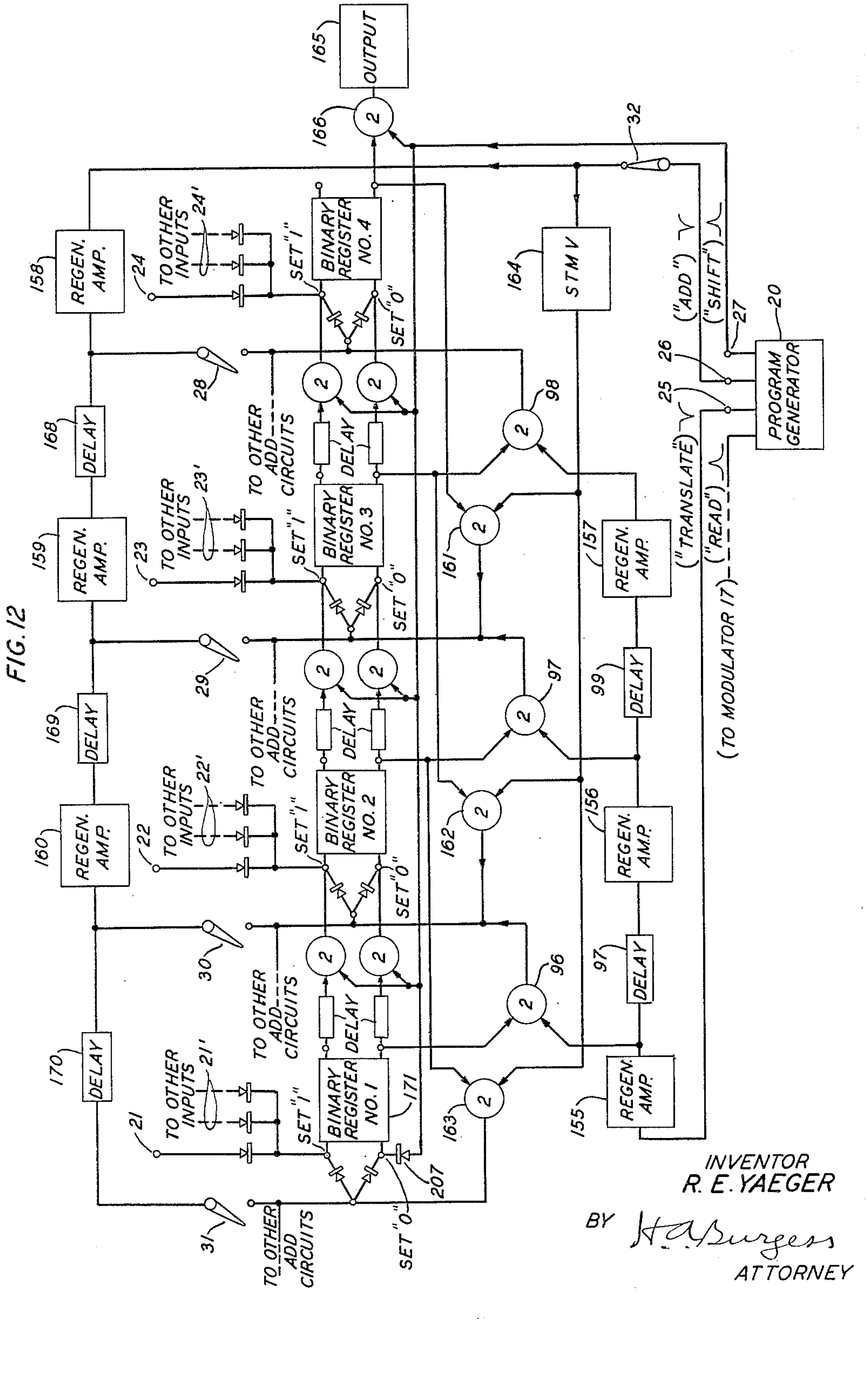
Fig. 12 illustrates by block schematic diagram a system adapted to perform the functions of binary code translation, serial addition, and digit shifting.

The method of shifting digits employed in the present illustrative embodiments of the invention, for example, in Figs. 9 and 12, may be understood from a consideration of Figs. 10 and 11. The problem is to change the states of a series of binary registers so that the stored information moves one place to the right along the linear array of registers. There are two basic ways of accomplishing this. The first way is to sample the state of each register and cause the next register to go to this state. The second is to set all registers to "0" and then set to "1" those registers where "1" was stored in the preceding register. The latter method is illustrated in an article entitled "Digital Computers for Scientific Applications," by West and DeTurk, which appears in the Proceedings of the I. R. E. for December, 1948. The register shown in Fig. 10 employs the first of these methods.

Assuming the registers 142—144 to be initially set to "0," a number in binary form applied to terminals 145—147 is read into the registers with the most significant digit being read into register 142. The *a* and *b* outputs of each register are connected by way of interstage circuits to the set to "0" and set to "1" inputs of the register storing the digit of next lower significance. These interstage circuits include delay elements 148 and 149, coincidence gates 150 and 151, and pulse amplifiers 152 and 153. The shift pulse applied over lead 151 sets register 142 to "0" and enables the interstage coincidence gates 150 and 151. One of these gates in each interstage will be enabled and, more specifically, the one whose enabling input other than the one to which the shift pulse is applied is connected to a terminal *a* or *b* whose potential is representative of a "1."

For example, if register number 1 is storing a "1," the gate 151 will be completely enabled upon the application of the shift pulse; since the potential of the *a* terminal of the register represents the digit it is storing; if register 142 is storing a "0," the potential at terminal *b* of this register will be representative of a "1," the logical negative of the "0" represented at terminal *a*, so that the gate 150, upon the application of a shift pulse, will be completely enabled. The delays 148 and 149 provide the required memory so that the gates 150 and 151 will respond to the state of the registers prior to the application of a shift pulse, even though the controlling register may be in a changing condition. Therefore, if register number 1 was registering a "1" prior to the first shift pulse, the gate 151 will be enabled and set register number 2 to a "1" if it were registering a "0," leaving it in a state of "1" if it were originally registering a "1." In a similar manner, the state of register number 2 will be passed on to the register number 3 and the state of register number 3 to a following register, if any, upon the application of the first shift pulse. In effect, the original number stored in the register is shifted one digit to the right. Successive shift pulses perform the same operation, each pulse shifting the stored digit one digit to the right until all digits of the number have been shifted out of the register.

It may be noted that the shifting process in this type of register is controlled entirely by a programmed shift pulse, so that the interstage networks will cause no interference with the translation process as described in connection with Fig. 6 when it is incorporated in this type of register. The pulse amplifiers 152 and 153 provide interstage gain which may be necessary; if such gain is unnecessary, these amplifiers may be omitted. The delays 148 and 149 may also be omitted if the gates 150 and 151 have built in them sufficient memory to respond only to the states of their controlling registers prior to the application of shift pulses.

Illustrative interstage circuits which may be employed in the shift register of Fig. 10 are illustrated in Fig. 11. Only the first two stages are shown. The binary registers 142 and 143 comprise bistable transistor circuits which will be described in more detail in connection with Fig. 13. These registers each have two input terminals and two output terminals, as previously described. Terminal *a* of register 142 is connected to the "set to 1" input of register 143 by means of a resistor 201 and a crystal diode 202. Terminal *b* of register 142 is connected in a similar manner to the "set to 0" input of register 143 by means of a resistor 203 and a crystal diode 204. The circuits thus far described cooperate to form a pair of coincidence gates such as the gates 150 and 151 in Fig. 10. As will be described more fully below, the potentials of terminals *a* and *b* will be one of two negative values; if register 142 is storing a "1," the potential of terminal *b* will be more negative by a substantial amount than the potential of terminal *a*. Similarly, if register 142 is storing a "0," the potential of terminal *a* will be more negative than the potential of terminal *b*. The potentials of these terminals bias their associated diodes 202 and 204 so that a shift pulse applied to the two diodes by way of condensers 205 and 206 will find only one of the diodes in its low resistance or conducting condition. For example, if the register 142 is storing a "1," the potential at terminal *b* will bias the diode 204 sufficiently far in the reverse direction so that a positive shift pulse will not appear at the "set to 0" terminal of the register 143. The diode 202 will, however, be biased in the reverse condition by a much lesser amount, and the shift pulse will be able to overcome this reverse bias and apply a trigger pulse to the "set to 1" terminal of the register 143. The condensers 205 and 206 provide the memory for the circuit, the RC networks 201—205 and 203—206 providing, in effect, the delays provided by the delays 148 and 149 in Fig. 10.

In Fig. 11, it is assumed that register 142 is set in accordance with the most significant digit. The shift pulse is therefore applied, by way of a diode 207, directly to the "set 0" terminal of this register. In certain embodiments, such as those illustrated in Figs. 9 and 12, other circuits are also connected to the "set 0" terminal of the most significant register. The diode 207 prevents positive pulses which may be applied over these latter circuits from passing to the shifting gates, i. e., diodes 202 and 204, and causing premature shifting. In the illustrative embodiment employing type A transistors, the "set 0" terminal varies between two negative values on the order of −10 volts. A slightly larger negative voltage is applied to the other terminal of the diode 207 by the battery 208 and resistor 209. With these biases, the diode 207 will readily pass positive shift pulses to the "set 0" terminal but will substantially block any positive pulses applied directly to the "set 0" terminal by the above-mentioned other circuits. The condenser 210 readily passes the shift pulses but blocks direct current from the battery 208.

A combined code translator, adder, and shift register, which may be embodied in the box 16 in Fig. 1, is shown in Fig. 12. The number in reflected binary code which indicates the angular shaft position appears at the input terminals 21—24 in response to a "read" pulse from the program generator 20, as previously described. These digits are read into their respective binary registers where they are stored. A "translate" pulse is next sequentially applied to the translate gates 96—98 in the manner previously described (see Fig. 6) to translate the reflected binary code number into conventional binary code. Regenerative amplifiers 155—157 have been included in the lead supplying the translate pulse to the translate gates 96—98 to provide a pulse of sufficient amplitude to enable these gates. These amplifiers may be omitted if the translate program pulse is itself sufficient to enable all of these gates. An "add" pulse is next sequentially applied to the add switches 28—31, commencing with switch 28, which have been set in accordance with the number to be added to the number stored in the registers. Regenerative amplifiers 158—160 have also been included in these connections to provide stronger pulses if necessary. The coincidence gates 161—163 in the carry connections for addition (between the outputs *a* of the various registers and the reset terminals of the registers of next higher significance) perform the same function as gates 137 and 138 in Fig. 9. These gates are normally disabled so that these connections, required for this addition operation, do not interfere with the translation and shifting operations. They are enabled, however, during the adding interval by a single-trip multivibrator 164 which is triggered by the add pulse and which produces a single output pulse of sufficient duration to enable each of the gates 161—163 for a time sufficient to permit the adding function to be completed. After the addition operation is completed, the digits in the register are shifted out of the register, least significant digit first, to an output 165 in the same manner as described above in connection with Fig. 10. The coincidence gate 166 is enabled by the shift pulses to permit the digits being "read out" to pass to the output circuit. This gate, being normally disabled, isolates the output 165 from voltage changes at terminal *a* of register number 4 which may occur during the translation or addition operation. For the circuit shown in Fig. 12, the programming cycle is, therefore:

(1) a read pulse;
(2) a translate pulse;
(3) an add pulse;
(4) four shift pulses.

Figure 13:
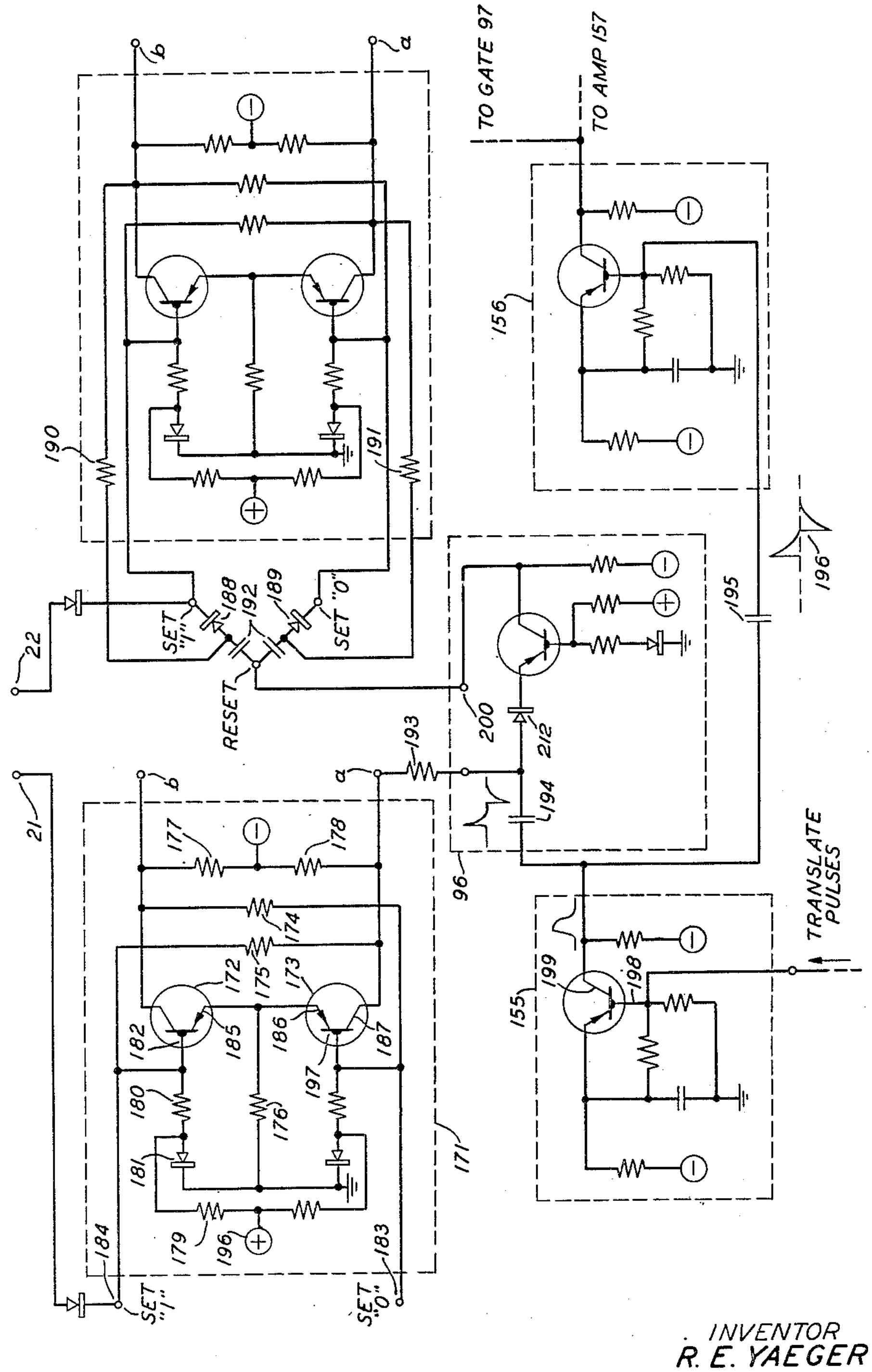
Fig. 13 illustrates schematically regenerative amplifiers, regenerative gates, and delays which may be employed in the circuit shown in Fig. 12.

Illustrative circuits which may be used to fill the boxes in Fig. 12 are shown schematically in Fig. 13. The binary register 171 is generally of the type disclosed in a copending joint application of A. E. Anderson and R. L. Trent, Serial No. 246,832, filed September 15, 1951, which issued on February 24, 1953, as Patent No. 2,629,834. This unit is a bistable circuit comprising two current multiplication transistors 172 and 173 having their base and collector electrodes cross-coupled by means of the resistors 174 and 175. The emitter electrodes are direct-current coupled by the common emitter resistor 176 which is returned to ground. A negative supply voltage is applied to the collector electrodes by way of the collector resistors 177 and 178.

Each half, i. e., each transistor, of this circuit is a trigger circuit, having two stable operating points, one characterized by high collector cugrrent, the other by low collector current. Referring to the trigger circuit employing transistor 172, both halves being similar, the trigger action is made possible by the resistors 179 and 180 and the asymmetrical impedance element 181 (e. g., germanium crystal diodes), which promote regenerative feedback from the collector to the emitter circuits, thus giving rise to a region of negative resistance in the emitter current-emitter voltage characteristic which is bounded on either side by regions of positive resistance. The stable operating points alluded to above lie in the regions of positive resistance. This action is similar to that provided by the base resistor 42 in the illustrative regenerative amplifier shown in Fig. 3 with the exception that in Fig. 13, the resistor 176, effectively the load-line resistor, is proportioned to give the transistor trigger circuits each two stable operating points instead of just one. The diode 181 and resistors 179 and 180 aid in stabilizing the trigger point, as described in a copending application of A. J. Rack, Serial No. 185,041, filed September 15, 1950, which issued as Patent 2,579,336 on December 18, 1951. In the negative emitter current regions, the diode 181 is in its low resistance condition aided by positive bias from the source 196. Variations in base current in this region, which have been found to arise from temperature variations as well as variations in the internal base resistance from unit to unit will therefore have relatively little effect on the trigger point, since the low forward resistance of the diode in this region shunts down the relatively high resistance of resistor 179. In the positive emitter current region, the fixed bias from the source 196 is overcome by the positive base current, so that diode 181, in this region, is in its high resistance condition and effectively an open circuit so that the effective base resistance in this region is determined primarily by the resistor 179. (By way of example, resistor 179 may be on the order of 10,000 ohms, while the reverse resistance of the diode is on the order of 100,000 ohms.) The diode 181 effectively "switches" the resistor 179 in and out of the base circuit, switching it out when its presence might give rise to variations in the trigger point and switching it in when it is needed to provide regenerative feedback. The resistor 180 is small compared to resistor 179 and insures instability whenever the positive emitter current exceeds zero amperes in the event the diode 181 should not switch to its high resistance condition precisely at zero emitter current; this is disclosed in more detail in a copending application of R. L. Trent, Serial No. 223,522, filed April 28, 1951, which issued on December 16, 1952, as Patent No. 2,622,211.

The common emitter resistor 176 insures that, once the circuit is initially triggered, one side will be On and one side Off, "On" referring to high collector current and "Off" to low collector current. In general, triggering is effected by turning the On side Off. Since the circuits shown are triggered on the base electrode 182 and 197 of the transistors, the triggering pulses are positive pulses. Assuming the trigger circuit comprising transistor 172 to be On and the other half comprising transistor 173 to be Off, a positive trigger pulse applied to terminal 183, the Off side, would not disturb the circuit. A positive pulse applied to terminal 184 would, however, turn the On side Off by biasing the base 182 of the On side more postive than its emitter 185. The same pulse would also be applied to the emitter 186 of the Off unit by virtue of the common emitter coupling, since the forward emitter resistance of the On unit is relatively low. This would cause collector current to flow in the Off unit and raise the potential of the collector electrode 187 by virtue of the drop across the collector resistor 178. This rise in collector potential would be applied back to the base electrode 182 of the On unit by way of resistor 175 and aid the positive trigger pulse in turning this unit Off. It may be seen that this action is cumulative so that the circuit will eventually stabilize with the lower unit On and the upper unit Off. It may also be seen that the potentials of the output terminals *a* and *b*, which are connected to the collector electrodes, will vary between two values, both negative. The more positive (less negative) of these values, i. e., the collector potential of the On unit, is arbitrarily chosen to represent a "1" and the more negative a "0." If output is taken as the steady voltage of output terminal *a*, the input terminal 184 becomes the "set to 1" terminal, since a positive trigger applied to this terminal causes output terminal *a* to assume the more positive of its two possible negative potentials. Input terminal 183 is, therefore, the "set to 0" input.

The reset circuit is shown only for the right-hand register and comprises two steering diodes 188 and 189. They are termed steering diodes because they "steer" pulses applied to the reset terminal *r* to the base electrode of the On unit. Each of the steering diode is biased by the colletor to base voltage of the transistor to which it is connected, which voltage appears across resistors 190 and 191. The base electrode of the On unit will be slightly more negative than the base electrode of the Off unit, while the collector electrode of the On unit will be much less negative than the collector of the Off unit. To illustrate with exemplary values, the base and collector of an On unit will be at −10 and −12 volts, respectively, while the base and collector of an Off unit will be at −4 and −35 volts, respectively. The steering diode connected to the Off unit is therefore biased in the reverse direction by a substantially larger voltage than the steering diode connected to the On unit; using the exemplary values, the diode connected to the Off unit will have a reverse bias of 31 volts, while the diode connected to the On unit will have a reverse bias of but 2 volts. It may be seen, therefore, that a postive trigger pulse having an amplitude greater than the reverse bias of the On diode but less than the reverse bias of the Off diode (2 to 31 volts with the illustrative values given) will be readily steered to the base of the On unit and thus trigger the circuit into its other stable condition. The storage effect of the condensers 192 ends to keep the input or reset pulse correctly steered until the register has completely changed state.

The regenerative amplifiers 155 and 156 are identical, schematically speaking, with the amplifier shown in Fig. 3, with the exception that they are triggered by negative input pulses applied to the base electrodes 198 instead of by positive pulses applied to the emiter electrodes. When triggered, a positive voltage pulse is produced at the collector 199.

The coincidence circuit 96 illustrated is a regenerative gate of the type described and claimed in a copending application of R. L. Trent, Serial No. 246,832, filed September 15, 1951, which issued on February 24, 1953 as Patent No. 2,629,834. The central portion of this circuit is a stabilized transistor trigger circuit of the type employed in the register 171. The crystal diode 212 increases the slope of the emitter current-emitter voltage characteristic of the circuit in the negative emitter current region, thereby providing additional discrimination against input pulses which nominally should not trigger the circuit. A first input for the circuit is provided by way of resistor 193 which is connected to the *a* terminal of the register 171. The resistor 193 is in effect the load-line resistor for the trigger circuit of the regenerative gate 96 and is proportioned to make the latter monostable. Further, the negative potential at terminal *a*, regardless of whether the register 171 is storing a "0" or a "1," normally biases the gate 96 in the Off condition.

A second input for the regenerative gate 96 is provided by way of the condenser 194, which is connected to the output of the regenerative amplifier 155. The amplifier 155 delivers positive output pulses when triggered, as mentioned above. If the register 171 is storing a "1," its output terminal *a* will have the less negative of its two values. When this potential is applied by way of the resistor 193 to the input of gate 96, the latter is susceptible to triggering by positive pulses of the amplitude delivered by the regenerative amplifier 155. In other words, if the register 171 is storing a "1," the regenerative amplifier 155, when triggered, will deliver an output pulse which will trigger the regenerative gate 96. When the register 171 is storing a "0," the potential at terminal *a* will be sufficiently negative so that even though the amplifier 155 is triggered, the gate 96 will not be triggered. The gate 96, when triggered, delivers at its output terminal 200 a positive pulse which is applied to the reset terminal of the succeeding register to reset the latter.

The condenser 194, in addition to blocking direct current, differentiates the output pulse produced by the amplifier 155 to provide a more sharply defined positive trigger pulse. The trailing negative pulse, also produced by the differentiating action, does not disturb the regenerative gate 96. The condenser 195 which couples a portion of the output of the regenerative amplifier 155 to the triggering input of the regenerative amplifier 156 also differentiates this output pulse, the latter differentiated pulse 196 being indicated on the drawing. Since the amplifier 156, similar to the amplifier 155, is triggered only by negative pulses and is insensitive to positive pulses, there will be a delay between the triggering of the regenerative gate 96 if the latter is triggered and the triggering of the regenerative amplifier 156. With the various circuits responding to voltages of the polarities as described or their converse, this differentiating action permits using the same pulse to trigger the gate 96 and the amplifier 156 without the need of the delay elements 97 and 99 shown in Fig. 12.

The regenerative amplifiers 158—160 in the addition circuits in Fig. 12 may be of the same types as the amplifiers 155 and 156 shown schematically in Fig. 13. Further, if the polarities of their output pulses are correct, their associated delays 168—170 may also be omitted in a similar manner.

Time sharing is readily possible with the combined translator-adder-register shown in Fig. 12. If the same correction factor (i. e., the number represented by the positioning of switches 28—31) is to be added to all of the coded numbers, the only additional circuits required will be auxiliary input circuits 21′—24′, as indicated on the drawing. The programming cycle and hence generator 20 (Fig. 1) would be modified to accommodate the additional inputs. A first number would be read in from one set of inputs, translated, added to the number represented by the switches 28—31, and read out; then a second number would be read in from another set of inputs, translated, added, and read out, etc. If a coder is associated with each set of inputs, the read pulse would, of course, energize each in turn. If a different correction factor is to be added to the numbers read in to the different sets of inputs, other "add" circuits (i. e., similar to the switches 28—31 and associated regenerative amplifiers 158—160 and relays 168—170) would be necessary; the program generator would then deliver an "add" pulse to each "add" circuit in turn and, more specifically, to the "add" circuit associated with the coder energized by the next preceding "read" pulse. The output 165 would receive the numbers from the various inputs in a time division multiplex manner (but not interlaced).

Although the invention has been described as relating to particular embodiments, it should be understood that these embodiments are merely illustrative and not restrictive and that other embodiments will readily occur to one skilled in the art. The claims should not be deemed limited, therefore, to the specifically disclosed illustrations. In particular, it is emphasized that the invention is not limited to the use of transistors. Further, the specifically disclosed binary registers, coincidence gates, and regenerative amplifiers are merely illustrative of apparatus which will perform the desired function and, per se, comprise no part of the present invention.

What is claimed is:

1. Apparatus for translating a number in a first binary code into its equivalent number in a second binary code, the digits of said numbers comprising binary characters of a first or a second kind, said apparatus comprising a linear array of binary registers, means for setting up the number to be translated in said registers, one digit in each register, means for each of said registers except a first register in which the most significant digit is set for determining the character of the digit of next higher significance, and means responsive to said determinations for resetting each of said registers except said first register in response to a determination that said digit of next higher significance is a digit of said first kind.

2. The combination in accordance with claim 1, wherein said first binary code is the reflected binary code and wherein said second binary code is the conventional binary code, and means for sequentially operating said resetting means in response to said determinations.

3. The combination in accordance with claim 1, wherein said first binary code is the conventional binary code and wherein said second binary code is the reflected binary code, and means for simultaneously operating said resetting means in response to said determinations.

4. In combination, a plurality of binary code registers, means for setting the said registers in accordance with the digits of a number in reflected binary code, resetting means for each of said registers except the one in which the most significant digit of said number is registered which, when enabled, change the binary character of the digit registered therein, a gate associated with each of said registers except the register storing the least significant digit of said number, said gates each having two inputs and an output and adapted to produce an enabling output only in response to the coincident enabling of both of said inputs, means for enabling one of said inputs of each of said gates in response to the registering in its associated register of a binary digit of a first characteristic, means for sequentially enabling the other of said inputs of each of said gates commencing with the gate associated with the register storing the most significant digit of said number and proceeding with the gates associated with the other of said registers in order of decreasing significance, and means for applying the said output of each of said gates to the said resetting means of the register storing the digit of next lower significance.

5. A system for translating numbers in reflected binary code into their equivalent numbers in the conventional binary code comprising a plurality of bistable devices, one for each of the digits of the number to be translated, each of said devices having an output whose voltage is indicative of the stable state in which it is set; means to set each of said devices in one or the other of its stable states in accordance with the binary character of the digits of said number; reset means for each of said devices except the device whose stable state is representative of the most significant digit of said number; a plurality of electronic gates, one for each of said reset means, each of said gates having an output connected to its associated reset means; means to enable each of said gates in response to a voltage of a predetermined magnitude and polarity; means to derive said last-named voltages from the said outputs of the bistable devices other than the bistable device whose state is representative of the least significant digit of said number; means to apply each of said voltages to the said enabling means of the electronic gate associated with the bistable device which is set in accordance with the digit of next lower significance than the digit whose character is represented by the state of the device from which the said voltage is derived, and means to apply a pulse to each of said gates, one at a time, commencing with the gate associated with the register which is storing the second most significant digit of said number and proceeding with the gates associated with the other registers in order of decreasing significance.

6. Apparatus for adding a first number in reflected binary code to a second number in conventional binary code comprising a plurality of binary code registers, means to set said registers in accordance with the digits of said first number, said registers each having an output whose voltage is representative of the character of the digit registered therein, means responsive to an applied pulse of the proper polarity and magnitude to reset said registers, an electronic gate associated with each of said registers except the register storing the least significant digit of said first number, said gates each having a first and a second input and an output, means connecting the said output of each of said registers to the said first input of its associated gate, means to sequentially apply a reset pulse to the said second input of each of said gates commencing with the gate associated with the register storing the most significant digit of said first number, said gates adapted to producing an output only in response to the coincidence of a voltage at the said output of its associated register which is representative of a binary digit of a first characteristic and a reset pulse at said second input, means to apply the outputs produced by said gates to the said resetting means of the register storing the digit of next lower significance than the digit stored in the register associated with the gate producing the output, an Add circuit including switching means to open or close said Add circuit connected to each of said resetting means, a Carry circuit connecting the said output of each of said registers with the said resetting means of the register storing the digit of next higher significance, means to open or close said switches in accordance with the digits of said second number, the significance of the digits represented by the opening or closing of said switches corresponding to the significance of the digits stored in the registers to which said switches are connected, and means to sequentially apply an add pulse to each of said Add circuits commencing with the circuit connected to the register storing the digit of least significance and proceeding with the Add circuits associated with the other registers in order of increasing significance.

7. The combination in accordance with claim 6, wherein said Carry circuits include means to normally disable said second-named circuits, and means to enable said carry circuits during the application of said reset pulses and the period required for the said registers to stabilize after said reset pulses have been applied.

8. Apparatus for translating a number in reflected binary code into its equivalent number in conventional binary code comprising an array of successive binary registers, means for setting successive registers of said array in accordance with the binary character of successive digits of said number in reflected code, means for deriving an output from each of said registers which is representative of the character of the digit registered therein, means for resetting each of said registers except the register set in accordance with the most significant digit of said number in reflected code, an electronic gate associated with each of said reset means, each of said gates having a first and a second input and an output and adapted to produce an output of a particular kind only when enabled at one of its inputs by a voltage of a predetermined value and at the other input by a pulse of a second polarity, means for applying the said output of the register set in accordance with the digit of next higher significance than the digit in accordance with which the register whose reset means is associated with each gate is set to the said first input of said each gate, a plurality of trigger circuits, one for each of said gates, adapted to be triggered by pulses of a first polarity and producing, when triggered, pulses of said second polarity, means for triggering the first of said trigger circuits, means for applying the output of each of said trigger circuits to the said second input of its associated gate, means for each of said trigger circuits except the last for differentiating a portion of its output and for applying the differentiated output to the input of the next succeeding trigger circuit, and means for applying the output of each of said gates to the said resetting means of its associated register.

9. Apparatus for obtaining the sum of a first and a second number, the digits of said numbers comprising binary characters of a first and a second kind, said apparatus comprising a plurality of binary registers for storing representations of binary characters, input means for resetting each of said registers only in response to voltage changes of a predetermined nature, output means for deriving from each of said registers voltage changes of said predetermined nature in response to a change in the binary digit stored therein from a binary character of said first kind to a binary character of said second kind, means to set said registers in accordance with the character of the digits of said first number, each of said registers storing one of said digits, means connecting each of said output means except the output means of the register storing the most significant digit of said first number with the said input means of the register storing the digit of next higher significance, means to represent the digits of said second number of said first kind of voltage changes of said predetermined nature, means to otherwise represent the digits of said second number of said second kind, and means to sequentially impress each of said representations of said second number on the said input of the register storing the digit of said first number equal in significance to the digit of said second number which the representation being impressed thereon represents commencing with the least significant digit-representation of said second number and proceeding in order of increasing significance.

10. The combination in accordance with claim 9, and means to shift the digits stored in each of said registers to the register which, prior to said shifting, was storing the digit of next lower significance than the digit being shifted, whereby the least significant digit stored in the registers prior to each shifting operation is shifted out of said registers, and wherein said last-named means in claim 9 comprise means to alternately (*a*) impress one of said representations on the input of one of said registers, commencing with the least significant digit-representation of said second number and proceeding with the said representations in order of increasing significance, and (*b*) enable said shifting means, until the complete sum of said first and second number has been obtained, said one register comprising the register set by said setting means in accordance with the least significant digit of said first number.

11. The combination in accordance with claim 9, wherein said last-named means comprise means to impress sequentially the said representations of said second number on the said inputs of said registers commencing with the least significant digit-representation of said second number and proceeding with the said second number digit-representations in order of increasing significance, the digit-representation being applied to each of said register inputs being equal in significance to the digit of said first number stored therein.

12. The combination in accordance with claim 9, wherein said last-named means comprise a plurality of circuits, one for each of said registers, each of said circuits having an input and an output, and means connecting the outputs of said circuits uniquely to the said inputs of said registers, and wherein said digit-representing means comprise means to complete or break each of said circuits in accordance with the character of the digit of said second number whose significance is equal to the significance of the digit of said first number in accordance with which the register to which the circuit is connected is set, a source of pulses, means to apply said pulses sequentially to the said inputs of said circuits commencing with the circuit connected to the register set in accordance with the least signicant digit of said first number and proceeding with the circuits connected to registers set in according with digits of increasing by higher significance.

13. The combination in accordance with claim 12, wherein said last-named means comprise means including delay means connecting the said input of each of said circuits, except the said circuit connected to the input of the register set in accordance with the most significant digit of said first number, to the input of the said circuit connected to the register set in accordance with the digit of next higher significance, and means to apply one of said pulses to the input of the said circuit connected to the said register set in accordance with the least significant digit of said first number.

14. Apparatus for translating a number in the reflected binary code into its equivalent number in the conventional binary code which comprises a plurality of binary registers, means for setting up the number to be translated in said registers, resetting means for each of said registers except the register in which the most significant digit is set, a plurality of coincidence gates, one for each of said registers except the register in which the least significant digit is set, means responsive to the character of the digit set in each register associated with one of said gates for applying a first input to its associated gate, a source of control signals, means for applying said control signals to said gates as second inputs, and means for applying the output of each of said gates to the said resetting means of the register in which is set the digit of next lower significance than the digit to whose character the said gate responds.

15. The combination in accordance with claim 14 wherein said coincidence gates comprise gating means adapted to respond with an output only in response to a coincidence of a first input indicative of binary digit "1" and the application of a control pulse to said second input.

16. Apparatus for translating a number in the reflected binary code into its equivalent number in the conventional binary code which comprises a plurality of binary registers, one for each digit of the said number to be translated and each of said registers producing at an output indications of the binary character of the digit registered therein, means for setting up the digits of said number to be translated in said registers, resetting means for each of said registers except one which, when enabled, change the binary character of the digit registered therein, and means for controlling said resetting means which comprise gating means connected between the said output of each register, except one, and the reset means of the register in which the digit of next lower significance is registered, a source of control pulses, and means for sequentially applying a control pulse from said source to each of said gates in order of decreasing significance of the digits registered in their associated registers.

17. The combination in accordance with claim 16 wherein each of said gating means responds to enable its associated resetting means only in response to a coincidence of (1) the application of one of said control pulses and (2) an indication of a binary digit of a first kind in the said output of the binary register whose output is connected to said gate.

18. Apparatus for obtaining the sum of a first and a second number, the digits of said numbers comprising binary characters of a first and a second kind, said apparatus comprising a linear array of binary registers, means for setting successive registers of said array in accordance with successive digits of said first number commencing with the least significant digit of said first number, means for resetting each of said registers in response to applied voltage changes of a first kind, means responsive to a resetting of each of said registers from a binary character of said first kind to a binary character of said second kind for deriving therefrom a voltage change of said first kind, means for applying the said voltage changes derived from each of said registers to the said resetting means of the next succeeding register, means for representing successive digits of said second number by voltage changes of a first or a second kind in accordance with the character of the digit being represented, and means for impressing each of said representations on said registers comprising means to apply successive representations of the digits of said second number, commencing with the representation of the least significant digit of said second number, to the said resetting means of the register set in accordance with the digit of said first number of corresponding significance, and means for delaying the application of each of said successive representations of said second number for a time interval at least as long as the time interval required for a succeeding register to be reset.

References Cited in the file of this patent

UNITED STATES PATENTS

| | | |
|---|---|---|
| 2,404,047 | Flory et al. | July 16, 1946 |
| 2,514,671 | Rack | July 11, 1950 |
| 2,533,242 | Gridley | Dec. 12, 1950 |
| 2,570,220 | Earp | Oct. 9, 1951 |
| 2,571,680 | Carbre | Oct. 16, 1951 |
| 2,590,110 | Lippel | Mar. 25, 1952 |

OTHER REFERENCES

Theory and Techniques for Design of Electronic Digital Computers; University of Pennsylvania; Moore School of Electrical Engineering, vol. II, November 1, 1947; (pp. 16–16 to 16–18 relied upon).

A Digital Computer for Scientific Applications; West and DeTurk; Proceedings of the IRE, December 1948, pp. 1452–1460.

The Binary Quantizer; K. H. Barney, "Electrical Engineering, November 1949, pp. 962–967.